3,061,430
Patented Oct. 30, 1962

3,061,430
PHOTOGRAPHIC PROCESS FOR MAKING PRINTING PLATES AND LIGHT SENSITIVE NAPHTHOQUINONE THEREFOR

Fritz Uhlig, Fritz Endermann, and Wilhelm Neugebauer, Wiesbaden-Biebrich, Germany, assignors, by mesne assignments, to Azoplate Corporation, Murray Hill, New Jersey
No Drawing. Filed Jan. 7, 1960, Ser. No. 935
Claims priority, application Germany Jan. 14, 1959
39 Claims. (Cl. 96—33)

The present invention relates to reproduction layers for printing plates which include at least one light-sensitive ester of a naphthoquinone-(1,2)-diazide sulfonic acid and an aromatic compound which is substituted with hydroxyl groups and contains a tropolone system, for example, purpurogallin or its substitution products. The layers for the printing plates may also, if desired, contain alkali soluble resins.

It is known to the art to manufacture printing plates one surface of which is coated with a reproduction layer containing, as light-sensitive substances, esters of naphthoquinone-(1,2)-diazide sulfonic acids and aromatic hydroxyl compounds having aromatic rings of six carbon atoms, such as phenols or naphthols.

The light-sensitive esters to be used in the reproduction layers in accordance with the present invention are prepared by known methods, preferably by reacting naphthoquinone-(1,2)-diazide sulfonic acid chlorides with the aromatic component containing the hydroxyl group and the tropolone system in the presence of an acid-binding agent, such as alkali bicarbonate, alkali carbonate or other weak alkalies or organic bases, preferably tertiary amines such as pyridine or N-ethyl-piperidine, generally in homogeneous solutions in solvents, such as dioxane or tetrahydrofurane. In order to avoid formation of a dyestuff, the acid-binding agent must be added in such quantities only as to render the reaction mixture neutral or weakly alkaline. In general, the pH value of the solution should not exceed 8. For separation, the reaction product is precipitated from the reaction mixture by the addition of dilute hydrochloric acid, filtered by suction, and dried. In most cases, the sulfonic acid esters thus obtained can be immediately used for the preparation of the light-sensitive layer. Alternatively, they may be further purified by dissolving them in dioxane or another solvent and reprecipitating them by adding water to the solution.

Among the aromatic components containing hydroxyl groups and a tropolone system, purpurogallin, which has the following formula

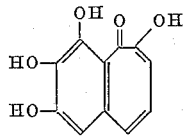

has proved to be especially suitable. It is easily synthesized by oxidizing pyrogallol, e.g. with sodium iodate.

By choosing the proper quantity of naphthoquinone-(1,2)-diazide sulfochloride and the corresponding quantity of an acid-binding agent for the reaction, one or more or all of the hydroxyl groups may be esterified. Compounds which contain from 1 to 3 ester groups thus having at least one free hydroxyl group, are preferred in the present invention.

Alternatively, compounds may be prepared in which prior to the reaction with sulfochloride the tropolone compounds are partially etherified, e.g. with dimethyl sulfate, diethyl sulfate, or diazo methane. Thus, esters are obtained which contain also lower alkoxy groups.

Further, the purpurogallin may be substituted by halides, such as bromine. Such substitution products of purpurogallin still contain the tropolone system and at least one free hydroxyl group which can be esterified with the naphthoquinone-(1,2)-diazide sulfochloride.

Among the naphthoquinone-(1,2)-diazide sulfochlorides to be used according to the present invention, the naphthoquinone-(1,2)-diazide-(2)-sulfochloride-(5) and the naphthoquinone-(1,2)-diazide-(2)-sulfochloride-(4) have proved especially suitable, but the naphthoquinone-(1,2)-diazide-(1)-sulfochloride-(5) and the naphthoquinone-(1,2)-diazide-(1)-sulfochloride-(4) may also be used.

In the formulae below, some of the preferably used naphthoquinone-(1,2)-diazide sulfonic acid esters are stated under their most probable constitutional formulae:

*Formula I*

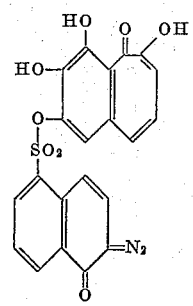

*Formula II*

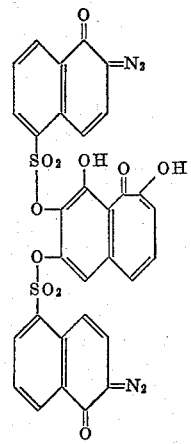

*Formula III*

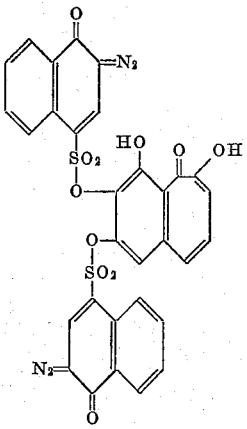

Formula IV

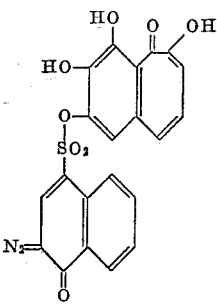

Formula V

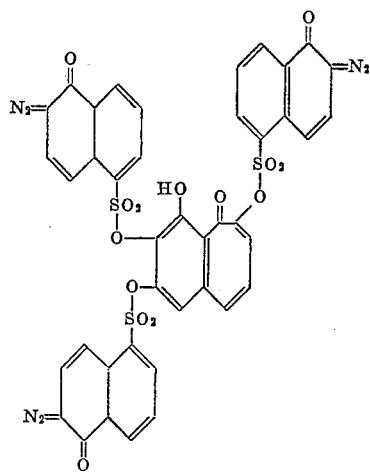

For the preparation of the reproduction layers the above described esters, which are practically water-insoluble, are dissolved in a suitable organic solvent and then coated onto a support in a manner known per se. If desired, they may be used in admixture with an alkali soluble resin. Copolymers of maleic acid anhydride with styrene, low molecular weight phenol-formaldehyde resin and cresol formaldehyde resins are preferred for this purpose.

The amount of the alkali soluble resin added to the light sensitive diazo esters described above may vary widely. For the production of planographic printing plates lower contents of resins are used, i.e. from about 0.1 to about 1 part by weight, preferably 0.3 to 0.8 part by weight of resin to 1 part by weight of ester. If the production of plates is intended which can withstand the acid etching agents used in etching machines for halftone blocks, higher resin contents are used, i.e. from about 1 to about 6 parts, preferably from about 2 to about 4 parts by weight of the resin to 1 part of the above described esters.

There may also be used mixtures of the above described esters with each other or with other light sensitive diazo compounds. In general, 1–4 percent solutions of the preferred purpurogallin esters are used for coating a support.

The supports used are metallic lithographic supports, e.g. foils or plates of aluminum, copper, zinc, or metal plates consisting of several metal layers, e.g. a base layer consisting of aluminum and an upper layer consisting of chromium, which are separated from each other by a copper layer. Nonmetallic supports, e.g. plastic films, special base papers or glass, may also be used.

The reproduction layers according to the present invention are photomechanically transformed into printing plates, i.e. the light sensitive layer is exposed to light under an original and then developed with dilute alkaline solutions, thus removing the areas of the reproduction layer which have been exposed to light. The plate is then rinsed with water. Then the areas, e.g. the aluminum foil, from which the layer has been removed by the developing process, are treated with an about 1 percent phosphoric acid solution, containing gum arabic, to improve the hydrophilic properties. The image areas in which the unaltered diazo compound remains are inked up with greasy ink. Thus, printing plates corresponding to the original used are obtained which may be set up in a printing apparatus and used for printing.

Alternatively, the plate may be etched before it is inked with greasy ink, so that clichés are obtained.

The printing plates prepared with the diazo compounds of the present invention are superior to the printing plates hitherto used in that they permit very long runs to be made and, in the unexposed state, they are more stable at higher temperatures, so that the supports provided with the reproduction layers in question have an improved shelf-life, even under adverse conditions.

The invention will be further illustrated by reference to the following specific examples:

Example I 1.5 parts by weight of the reaction product of 1 mol purpurogallin and 1 mol of naphthoquinone-(1,2)-diazide-(2)-sulfonic acid chloride-(5), corresponding to Formula I, are dissolved in 100 parts by volume of ethyleneglycol monomethylether, the solution is filtered and then coated onto a mechanically roughened aluminum foil which may be placed e.g. on a rotating disc. The foil is then dried by means of a current of warm air. For the preparation of a printing plate, the layer side of the foil is exposed under a master and the exposed layer is then developed with a one percent trisodium phosphate solution. In the parts of the layer not struck by light, the diazo compound remains unchanged. After rinsing the developed layer with water, it is treated with one percent phosphoric acid in order to improve the hydrophilic properties of the support and then inked with greasy ink. The printing plate thus obtained may be used for printing in an offset printing apparatus.

Similar results are obtained on eloxated aluminum foils and on silicated aluminum foils. The latter are obtained, e.g. by treating aluminum foils with alkali silicates.

The compound corresponding to Formula I is prepared as follows:

Twenty-seven parts by weight of naphthoquinone-(1,2)-diazide-(2)-sulfochloride-(5) and 22 parts by weight of purpurogallin are dissolved in 400 parts by volume of dioxane and, while stirring and at room temperature, about 100 parts by volume of a saturated sodium bicarbonate solution are cautiously added over a period of 20 minutes. Part of the reaction product precipitates at this stage. With agitation, the reaction mixture is then poured into 100 parts by volume of ice water and hydrochloric acid is added until the mixture has become acid-reacting. After 30 minutes, the light-brown monosulfonic acid ester, which now has completely precipitated, is filtered by suction, washed until neutral, and dried. The reaction product thus obtained is the 2'-monoester corresponding to Formula I. After recrystallization from glacial acetic acid and dioxane, the compound is obtained as an analytically pure light-brown crystalline substance which, upon heating to temperatures ranging from about 280 to about 330° C., decomposes while slowly charring. It is easily soluble in dimethyl formamide, soluble in dioxane, glacial acetic acid and ethyleneglycol monomethylether, but only difficultly soluble in ethanol or methanol.

Example II

In 100 parts by volume of ethyleneglycol monomethylether, there is dissolved 1.0 part by weight of the reaction product of 1 mol of purpurogallin and 2 mols of naphthoquinone-(1,2)-diazide-(2)-sulfonic acid chloride-(5), corresponding to Formula II, and 0.5 part by weight of an alkali soluble phenol formaldehyde novolak. An aluminum foil is coated with this solution and then a printing plate is prepared following the procedure of Example I.

The diazo compound corresponding to Formula II is prepared by dissolving in 400 parts by volume of dioxane, 54 parts by weight of naphthoquinone-(1,2)-diazide-(2)-sulfonic acid chloride-(5) and 22 parts by weight of purpurogallin and then adding, over a period of 30 minutes and while agitating at about 20° C., about 200 parts by volume of saturated sodium bicarbonate solution. The reaction mixture is poured into 100 parts by volume of ice water and hydrochloric acid is added until the mixture shows a weakly acid reaction. The precipitating yellow-brown bis-sulfonic acid ester is drawn off, washed neutral and dried. If crystallized from dioxane, the compound is obtained analytically pure in the form of an olive-yellow substance which, upon heating, decomposes at temperatures from about 280° C. to about 330° C., while slowly charring. It is easily soluble in dimethylformamide, soluble in warm dioxane, glacial acetic acid, and ethyleneglycol monomethylether, and hardly soluble in methanol or ethanol.

The diazo compound corresponding to Formula III is prepared analogously to the diazo compound corresponding to Formula II by dissolving 54 parts by weight of naphthoquinone-(1,2)-diazide-(2)-sulfonic acid chloride-(4) and 22 parts by weight of purpurogallin in 400 parts by volume of dioxane and then adding, over a period of 30 minutes and while agitating at a temperature of about 20° C., about 200 parts by volume of a saturated sodium bicarbonate solution. The reaction product is then poured in ice water and hydrochloric acid is added until the mixture shows a weakly acid reaction. The precipitate is then filtered by suction, washed neutral with water and dried.

For purification, the bis-ester is dissolved in dioxane and reprecipitated by adding water to the solution. It is obtained in the form of a dark-brown crystalline substance which, upon heating, melts at temperatures ranging from about 280 to about 330° C., while slowly charring. It is very easily soluble in ethyleneglycol monomethylether, dioxane, acetone, glacial acetic acid, dimethyl formamide, and other organic solvents.

*Example III*

In 100 parts by volume of ethyleneglycol monomethylether, there are dissolved 4 parts by weight of the reaction product of 1 mol of purpurogallin with 1 mol of naphthoquinone-(1,2)-diazide-(2)-sulfonic acid chloride-(4), corresponding to Formula IV, 3 parts by weight of an alkali soluble phenol formaldehyde novolak and, for improving the visibility of the developed image, 0.5 part by weight of the dyestuff "Methyl Violet" (G. Schultz, "Farbstofftabellen," 7th edition, 1931, vol. 1, page 327, No. 783); a clean zinc plate is coated with this solution. After exposure of the sensitized zinc plate under a master, the light-struck parts of the layer, which contain the light decomposition product of the original diazo compound, are removed by means of a 5 percent aqueous solution of trisodium phosphate to which 15 percent of ethylene glycol monomethylether had been added. Clichés suitable for relief and intaglio printing may be prepared in a manner known per se by chemically etching the exposed areas of the metal plate using a 4 percent solution of nitric acid.

Lithographic bimetallic or trimetallic plates may be analogously coated with the solution of the compound corresponding to Formula IV and then developed. Bimetallic plates consisting of an aluminum foil with a thin copper layer thereon are, after development, preferably etched with a saturated aqueous solution of ferric nitrate whereby the copper is removed in the non-imaged areas. Trimetallic plates consisting of an aluminum base, an intermediate copper layer, and a thin cover consisting of chromium, are, after exposure and development, preferably etched with a solution consisting of 500 parts by weight of calcium chloride, 80 parts by volume of glycerine, 80 parts by volume of concentrated hydrochloric acid, and 250 parts by volume of water. By this treatment, the chromium is removed from the non-imaged areas.

The diazo compound corresponding to Formula IV is prepared as follows:

Twenty-seven parts by weight of naphthoquinone-(1,2)-diazide-(2)-sulfonic acid chloride-(4) and 22 parts by weight of purpurogallin are dissolved in 400 parts by volume of dioxane and to this solution there are added, over a period of about 20 minutes and while agitating at room temperature, 100 parts by volume of a saturated sodium bicarbonate solution. While agitating, the reaction mixture is poured into 100 parts by volume of ice water and dilute hydrochloric acid is added until a weakly acid reaction is obtained. After 30 minutes, precipitation of the light-brown monoester is complete; it is drawn off, washed until neutral, and dried. For purification, the compound is dissolved in dioxane and reprecipitated by adding water to the solution. The purified compound is a light-brown finely crystalline substance which, upon heating in a melting point tube, begins to decompose and chars at temperatures ranging from about 280 to about 330° C. It is very easily soluble in dimethylformamide, dioxane, monomethylether, but almost insoluble in methanol and ethanol.

*Example IV*

A paper sheet which had been pretreated for the preparation of printing plates, e.g. a paper sheet manufactured in accordance with the disclosure of U.S. Patent No. 2,681,617, is coated with a 2 percent solution in methylglycol of the reaction product of 1 mol of purpurogallin with 3 mols of naphthoquinone-(1,2)-diazide-(2)-sulfonic acid chloride-(5) corresponding to Formula V, and the coated paper sheet is then dried by means of warm air. After exposing the sensitized sheet under a master, the light-struck areas of the layer, i.e. those areas containing the light decomposition product of the original diazo compound, are removed with an about 2 percent trisodium phosphate solution. The thus developed paper sheet may be used as a printing plate from which, after inking with greasy ink, prints can be made.

The diazo compound corresponding to Formula V is prepared as follows:

Eighty-one parts by weight of naphthoquinone-(1,2)-diazide-(2)-sulfonic acid chloride-(5) and 22 parts by weight of purpurogallin are dissolved in 500 parts by volume of dioxane and, over a period of 40 minutes and while agitating at room temperature, 300 parts by volume of a saturated sodium bicarbonate solution are added. While agitating, the reaction mixture is poured into 100 parts by volume of ice water, and hydrochloric acid is added until a weakly acid reaction is obtained. After about 40 minutes, the precipitating yellow triester is filtered by suction, washed neutral, and dried. For purification, the compound is dissolved in dioxane and reprecipitated by adding water to the solution. The compound thus obtained is a canary yellow finely crystalline substance which, upon heating, decomposes at temperatures ranging from about 280 to about 330° C., while slowly charring. It is easily soluble in dimethyl formamide, soluble in dioxane and ethyleneglycol monomethylether, but hardly soluble in methanol or ethanol.

*Example V*

Three parts by weight of the diazo compound obtained from 1 mol of purpurogallin and 1 mol of naphthoquinone-(1,2)-diazide-(2)-sulfonic acid chloride-(5) corresponding to Formula I and 10 parts by weight of a m-cresol-formaldehyde resin novolak of the softening point 108–118° C. and the color "normalhell-dunkel" are dissolved in 100 parts by volume of ethyleneglycol monomethylether. 0.3 part by weight of castor oil and 0.5 part by weight of Methyl Violet BB are added, the solution is filtered and then coated onto a polished zinc plate. The layer is then dried by means of a current of warm air. For the preparation of a cliché, the layer side of the zinc plate is exposed through a screen diapositive. The exposed layer side which now carries the image is treated with a cotton pad soaked with an about 2.5% trisodium phosphate solution containing also 10–15% (by volume) of ethyleneglycol monomethylether. The parts of the layer which are struck by light during exposure are removed from the surface of the zinc plate and an image corresponding to the master used remains on the metallic base material. After rinsing with water the plate is placed with its layer side on an earthenware trough provided with vane wheels which centrifuge dilute (7–8%) nitric acid against the plate.

Etching is performed either by the usual process in several steps or according to the one-step process. Without heating the zinc plate before etching, there is obtained a printed plate being especially suitable for book and illustration printing. Instead of a zinc plate it is also possible to use a lead or magnesia plate, the results obtained being equally good.

*Example VI*

In 100 parts by volume of ethyleneglycol monomethylether there are dissolved 2 parts by weight of the diazo compound obtained from 1 mol of purpurogallin and 2 mols of naphthoquinone-(1,2)-diazide-(2)-sulfonic acid chloride-(5) corresponding to Formula II and 6 parts by weight of a m-cresol-formaldehyde resin novolak of the qualities described in Example 5. 0.3 part by weight of sesame oil and 0.5 part by weight of rosaniline hydrochloride are added, the solution is then filtered and coated onto a polished copper plate. After exposure under a photographic negative the layer is treated with a cotton pad soaked with an about 2.5% trisodium phosphate solution containing also 10–15% (by volume) of ethyleneglycol monomethylether. Thereby the light struck parts of the layer are removed from the metallic carrier. The copper plate carrying parts of the layer according to the master is now etched at 20–22° C. with an iron chloride solution of 40° Bé.

The light sensitive solution is also suitable for directly coating rotating copper cylinders, one or more spray nozzles being used. A printing plate especially suitable for intaglio printing is obtained which after the usual chroming of the etched copper cylinders is particularly suitable for printing transparent foils.

It will be obvious to those skilled in the art that many modifications may be made within the scope of the present invention without departing from the spirit thereof, and the invention includes all such modifications.

What is claimed is:

1. A compound having the formula

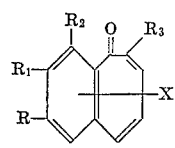

in which $R$, $R_1$, $R_2$, and $R_3$ are selected from the group consisting of hydroxyl naphthoquinone, quinone diazide sulfonyloxy groups and lower alkoxy, at least one of $R$, $R_1$, $R_2$, and $R_3$ being a naphthoquinone diazide sulfonyloxy group, and $X$ is selected from the group consisting of hydrogen and halogen.

2. A compound according to claim 1 in which at least one of $R$, $R_1$, $R_2$, and $R_3$ is hydroxyl.

3. A compound according to claim 1 in which at least two of $R$, $R_1$, $R_2$, and $R_3$ are hydroxyl.

4. A compound according to claim 1 in which at least three of $R$, $R_1$, $R_2$, and $R_3$ are hydroxyl.

5. A compound having the formula

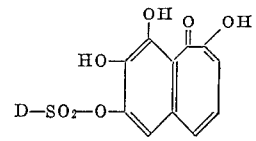

in which $D$ is a naphthoquinone-(1,2)-diazide radical.

6. A compound having the formula

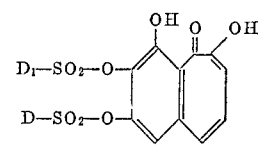

in which $D$ and $D_1$ are naphthoquinone-(1,2)-diazide radicals.

7. A compound having the formula

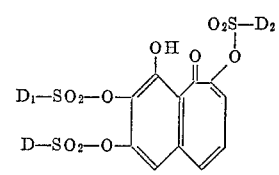

in which $D$, $D_1$, and $D_2$ are naphthoquinone-(1,2)-diazide radicals.

8. A compound having the formula

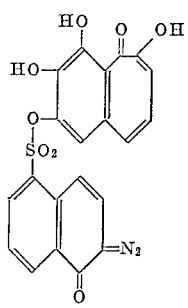

9. A compound having the formula

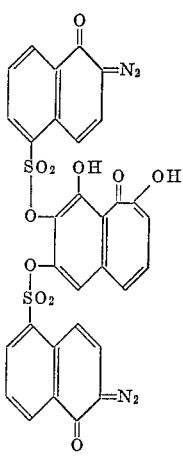

10. A compound having the formula

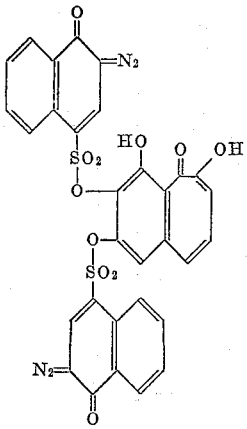

11. A compound having the formula

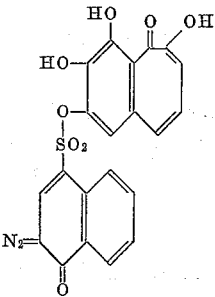

12. A compound having the formula

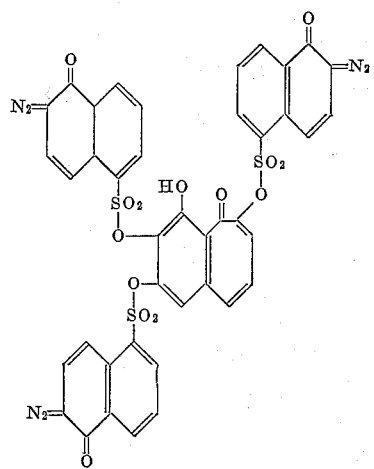

13. A presensitized printing plate comprising a base material having a coating thereon, the coating comprising a compound having the formula

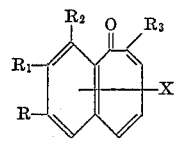

in which R, R₁, R₂, and R₃ are selected from the group consisting of hydroxyl naphthoquinone diazide sulfonyloxy groups and lower alkoxy, at least one of R, R₁, R₂, and R₃ being a naphthoquinone diazide sulfonyloxy group, and X is selected from the group consisting of hydrogen and halogen.

14. A presensitized printing plate according to claim 13 in which at least one of R, R₁, R₂, and R₃ is hydroxyl.

15. A presensitized printing plate according to claim 13 in which at least two of R, R₁, R₂, and R₃ are hydroxyl.

16. A presensitized printing plate according to claim 13 in which at least three of R, R₁, R₂, and R₃ are hydroxyl.

17. A presensitized printing plate comprising a base material having a coating thereon, the coating comprising a compound having the formula

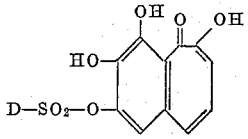

in which D is a naphthoquinone-(1,2)-diazide radical.

18. A presensitized printing plate comprising a base material having a coating thereon, the coating comprising a compound having the formula

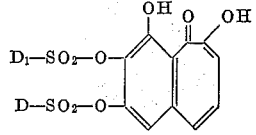

in which D and D₁ are naphthoquinone-(1,2)-diazide radicals.

19. A presensitized printing plate comprising a base material having a coating thereon, the coating comprising a compound having the formula

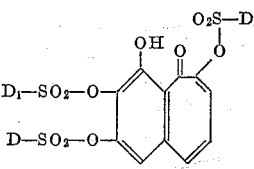

in which D, D₁, and D₂ are naphthoquinone-(1,2)-diazide radicals.

20. A presensitized printing plate comprising a base material having a coating thereon, the coating comprising a compound having the formula

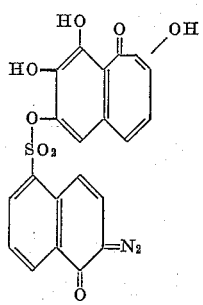

21. A presensitized printing plate comprising a base material having a coating thereon, the coating comprising a compound having the formula

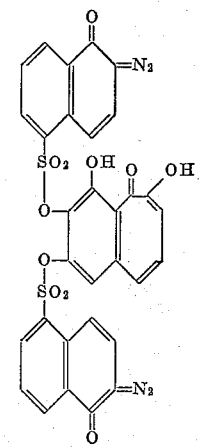

22. A presensitized printing plate comprising a base material having a coating thereon, the coating comprising a compound having the formula

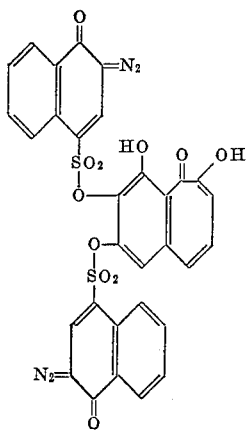

23. A presensitized printing plate comprising a base material having a coating thereon, the coating comprising a compound having the formula

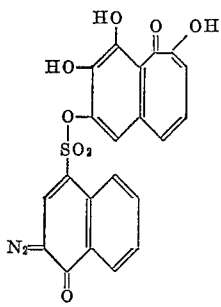

24. A presensitized printing plate comprising a base material having a coating thereon, the coating comprising a compound having the formula

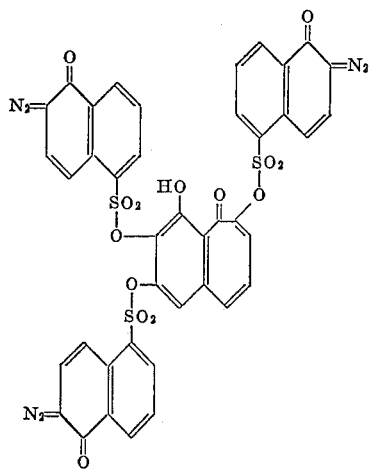

25. A process for making a printing plate which comprises exposing a coated base material to light under a master, the coating comprising a compound having the formula

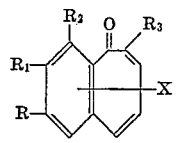

in which R, $R_1$, $R_2$, and $R_3$ are selected from the group consisting of hydroxyl, naphthoquinone diazide sulfonyloxy groups and lower alkoxy, at least one of R, $R_1$, $R_2$, and $R_3$ being a diazide sulfonyloxy group, and X is selected from the group consisting of hydrogen and halogen, and treating the exposed coating with a developing solution.

26. A process according to claim 25 in which at least one of R, $R_1$, $R_2$, and $R_3$ is hydroxyl.

27. A process according to claim 25 in which at least two of R, $R_1$, $R_2$, and $R_3$ are hydroxyl.

28. A process according to claim 25 in which at least three of R, $R_1$, $R_2$, and $R_3$ are hydroxyl.

29. A process for making a printing plate which comprises exposing a coated base material to light under a master, the coating comprising a compound having the formula

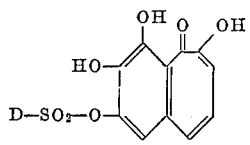

in which D is a naphthoquinone-(1,2)-diazide radical, and treating the exposed coating with a developing solution.

30. A process for making a printing plate which comprises exposing a coated base material to light under a master, the coating comprising a compound having the formula

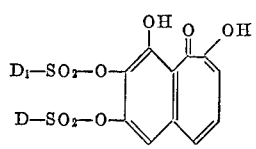

in which D and $D_1$ are naphthoquinone-(1,2)-diazide radicals and treating the exposed coating with a developing solution.

31. A process for making a printing plate which comprises exposing a coated base material to light under a master, the coating comprising a compound having the formula

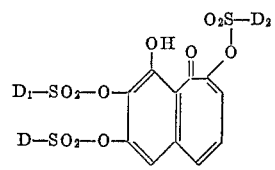

in which D, $D_1$, and $D_2$ are naphthoquinone-(1,2)-diazide radicals, and treating the exposed coating with a developing solution.

32. A process for making a printing plate which comprises exposing a coated base material to light under a master, the coating comprising a compound having the formula

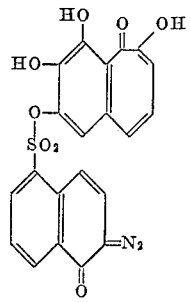

and treating the exposed coating with a developing solution.

33. A process for making a printing plate which comprises exposing a coated base material to light under a master, the coating comprising a compound having the formula

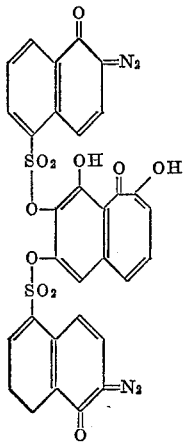

and treating the exposed coating with a developing solution.

34. A process for making a printing plate which comprises exposing a coated base material to light under a master, the coating comprising a compound having the formula

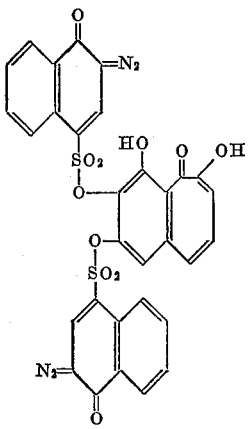

and treating the exposed coating with a developing solution.

35. A process for making a printing plate which comprises exposing a coated base material to light under a master, the coating comprising a compound having the formula

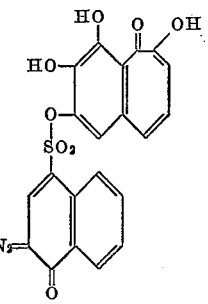

and treating the exposed coating with a developing solution.

36. A process for making a printing plate which comprises exposing a coated base material to light under a master, the coating comprising a compound having the formula

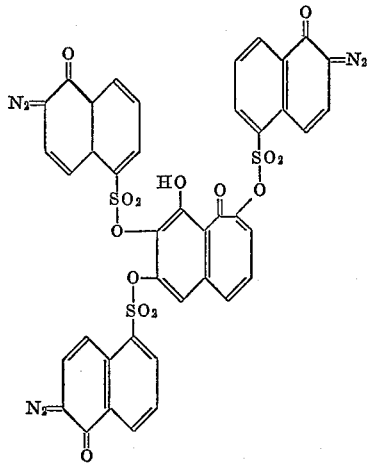

and treating the exposed coating with a developing solution.

37. A compound according to claim 1 containing halogen as a substituent directly linked to the purpurogallin nucleus.

38. A presensitized printing plate according to claim 13 in which compounds are used which contain halogen as a substituent directly linked to the purpurogallin nucleus.

39. A process according to claim 25 in which compounds are used which contain halogen as a substituent directly linked to the purpurogallin nucleus.

References Cited in the file of this patent

FOREIGN PATENTS 706,028   Great Britain _____ Mar. 24, 1954
739,654   Great Britain _____ Nov. 2, 1955

OTHER REFERENCES

Thorn and Barclay: Canadian Journal of Chemistry 30, pages 251–256 (1952).